(12) United States Patent
Miller et al.

(10) Patent No.: US 6,622,709 B2
(45) Date of Patent: Sep. 23, 2003

(54) FUEL CONDITIONING MODULE FOR REDUCING AIR IN A FUEL INJECTION SYSTEM

(75) Inventors: Terry L. Miller, Morton, IL (US); Phillip M. Hall, Fairfield, IL (US); Jeffrey L. Castleman, Normal, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/029,412

(22) Filed: Dec. 20, 2001

(65) Prior Publication Data

US 2003/0116142 A1 Jun. 26, 2003

(51) Int. Cl.[7] ............................................. F02M 37/04
(52) U.S. Cl. ...................................... 123/516; 123/510
(58) Field of Search ................................ 123/516, 514, 123/509, 510, 497

(56) References Cited

U.S. PATENT DOCUMENTS

| | | | | |
|---|---|---|---|---|
| 2,297,238 A | * | 9/1942 | Neugebauer et al. | |
| 2,878,889 A | * | 3/1959 | Gilbert | 123/516 |
| 4,589,395 A | * | 5/1986 | Timms et al. | 123/516 |
| 4,625,701 A | * | 12/1986 | Bartlett et al. | 123/514 |
| 4,732,131 A | * | 3/1988 | Hensel | 123/516 |
| 4,986,907 A | * | 1/1991 | Uzeta | 123/516 |
| 5,095,880 A | * | 3/1992 | Ricks | 123/516 |
| 5,231,967 A | * | 8/1993 | Baltz et al. | 123/497 |
| 5,372,116 A | * | 12/1994 | Davis | 123/516 |
| 5,392,750 A | | 2/1995 | Laue et al. | |
| 5,730,106 A | * | 3/1998 | Gonzalez | 123/516 |
| 5,873,347 A | * | 2/1999 | Kato et al. | 123/497 |

\* cited by examiner

*Primary Examiner*—Carl S. Miller
(74) *Attorney, Agent, or Firm*—Liell & McNeil

(57) ABSTRACT

Over aeration of fuel has been identified as a problem in some fuel injection systems. For instance, engineers have learned that it is desirable to reduce the amount of air in the fuel circulation plumbing of a pump and line fuel injection system in order to reduce timing retardation of the fuel injection and avoid engine power loss. A fuel conditioning module addresses this problem by separating out the air from the fuel before reaching the fuel injectors. The fuel conditioning module includes an inlet cavity separated from an outlet cavity by a baffle. An inlet passage opens to the inlet cavity, and an outlet passage opens to the outlet cavity at locations elevationally below the top of the baffle. A vent passage opens to the outlet cavity at a location elevationally above the top of the outlet passage. When the fuel air mixture flows over the baffle, the air is directed into the vent passage and the relatively pure fuel is directed to the outlet passage for delivery to the fuel injectors.

13 Claims, 4 Drawing Sheets

FUEL CONDITIONING MODULE FOR REDUCING AIR IN A FUEL INJECTION SYSTEM

TECHNICAL FIELD

This invention relates generally to fuel injection systems, and more particularly to a method and apparatus for separating air out of fuel upstream from the fuel injectors.

BACKGROUND

Many fuel injection systems can have performance undermined by the presence of air mixed into the fuel. This can be especially true in systems, such as pump and line systems, that operate at lower injection pressures. At lower injection pressures, the air can remain in a bubble form and occupy volume that should otherwise be occupied by fuel. At higher injection pressures, such as injection pressures achieved in pressure intensified systems, mixed air is often forced into solution, and therefore has less effect on injecting a desired volume of fuel. Nevertheless, mixing of air in unknown quantities into a fuel supply can be undesirable in higher pressure systems because it can cause a combustion characteristics to deviate from expected combustion characteristics, potentially undermining the control of the same.

Pump and line fuel injection systems require low levels of air in the fuel supply, steady pressure regulation and short priming times. Injection timing retardation and/or engine power loss can be an indication that the fuel reaching the fuel injectors is over aerated. In other words, air in the fuel supply can cause delayed fuel injection opening pressures, resulting in fuel injection occurring later than expected in the injection cycle and less than the desired amount of fuel being injected. Steady pressure regulation is desirable so that the high pressure fuel injection pump performs in a predictable manner. Finally, excess cranking times that occur when starting a cold engine can be an indicator that the fuel circulation plumbing is experiencing excessively long priming times.

The present invention is directed to overcoming one or more of the problems as set forth above.

SUMMARY OF THE INVENTION

In one aspect of the present invention, a fuel system for an engine includes fuel circulation plumbing with a fuel conditioning module. The fuel conditioning module includes an inlet passage, an inlet cavity, an outlet passage, a vent passage and an outlet cavity. The inlet cavity is separated from the outlet cavity by a baffle. The inlet passage opens to the inlet cavity and the outlet passage opens to the outlet cavity at locations elevationally below the top of the baffle. The vent passage opens to the outlet cavity at a location elevationally above the top of the baffle.

In another aspect of the present invention, a fuel conditioning module includes a housing having disposed therein an inlet passage, an inlet cavity, and outlet passage, an outlet cavity and a vent passage. The inlet cavity is separated from the outlet cavity by a baffle. The inlet passage opens to the inlet cavity and the outlet passage opens to the outlet cavity at locations elevationally below the top of the baffle. The vent passage opens to the outlet cavity at a location elevationally above the top of the baffle.

In yet another aspect of the present invention, a method of conditioning fuel includes dividing a mixture of fuel and air into a first portion having relatively large amounts of air and a second portion having relatively low amounts of air at least in part by separating an inlet cavity from an outlet cavity by a baffle. Routing the first portion into a vent passage that opens to the outlet cavity. Routing the second portion into an outlet passage that opens to the outlet cavity.

DETAILED DESCRIPTION

Figure 1:
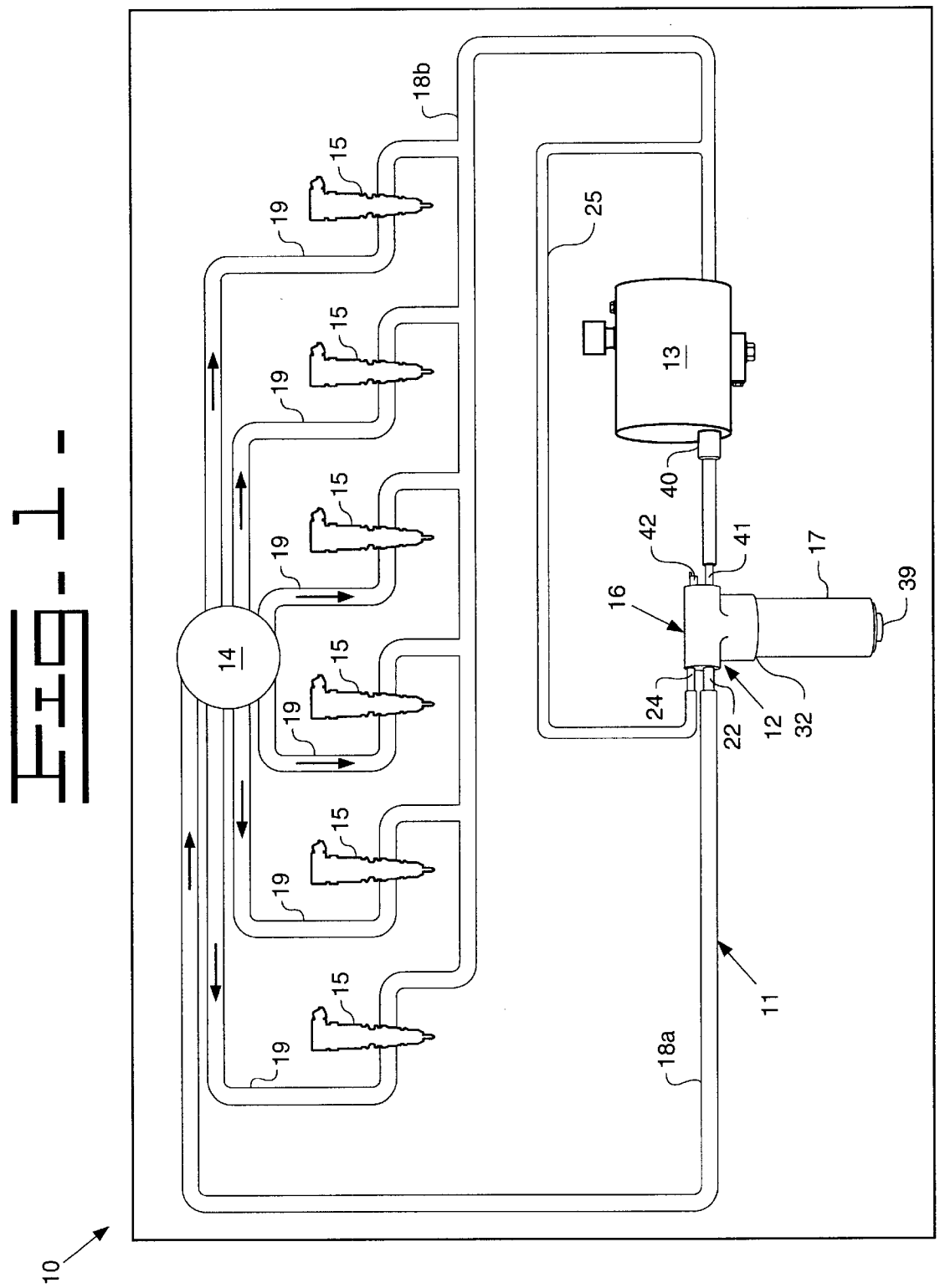
FIG. 1 is a schematic view of an fuel system according to the present invention.

Referring now to FIG. 1, a pump and line fuel injection system 10 includes fuel circulation plumbing 11 and a plurality of fuel injectors 15. Fuel circulation plumbing 11 refers to fuel tank 13 and the various passages that allow fuel to circulate through the fuel injection system 10. These passages include vent line 25, upstream passage 18a, branch passages 19 and downstream passage 18b, regardless whether the passage is through piping or embedded in another component, such as a passage through an engine block. After leaving a fuel tank 13, the relatively low pressure fuel is circulated via an electric fuel transfer pump 16 that is preferably contained within a common housing with a fuel filter 17 and a fuel conditioning module 12, After being filtered, pressurized and conditioned, a portion of the fuel is directed to high pressure fuel injection pump 14 for delivery at high pressure to individual fuel injectors 15 via individual branch passages 19, and an other portion is recirculated via vent line 25 back to fuel tank 13 for recirculation. Any leakage within fuel injectors 15 is returned for recircualtion via downstream passage 18b. If fuel conditioning module 12 is performing properly, fuel delivered to high pressure pump 14 has relatively small amounts of air, whereas the bulk of any air that enters the fuel supply is returned in a mixture with fuel via vent line 25 back to tank 13. The plurality of fuel injectors 15 are connected to the fuel circulation plumbing downstream from the high pressure fuel injection pump 14 but upstream from fuel tank 13. The vent line 25 connects at one end to a vent passage 24 originating from fuel conditioning module 12, and at its other end to the fuel circulation plumbing 11 downstream from fuel injectors 15 but upstream from fuel tank 13. The fuel conditioning module 12 is preferably positioned upstream from the high pressure fuel injection pump and downstream from the fuel tank 13. The fuel filter 17 is fluidly connected to the fuel circulation plumbing downstream from fuel tank 13 and upstream from fuel conditioning module 12. Finally, the electric fuel transfer pump 16 is preferably connected to the fuel circulation plumbing between the fuel filter 17 and the fuel conditioning module 12.

Figure 2:
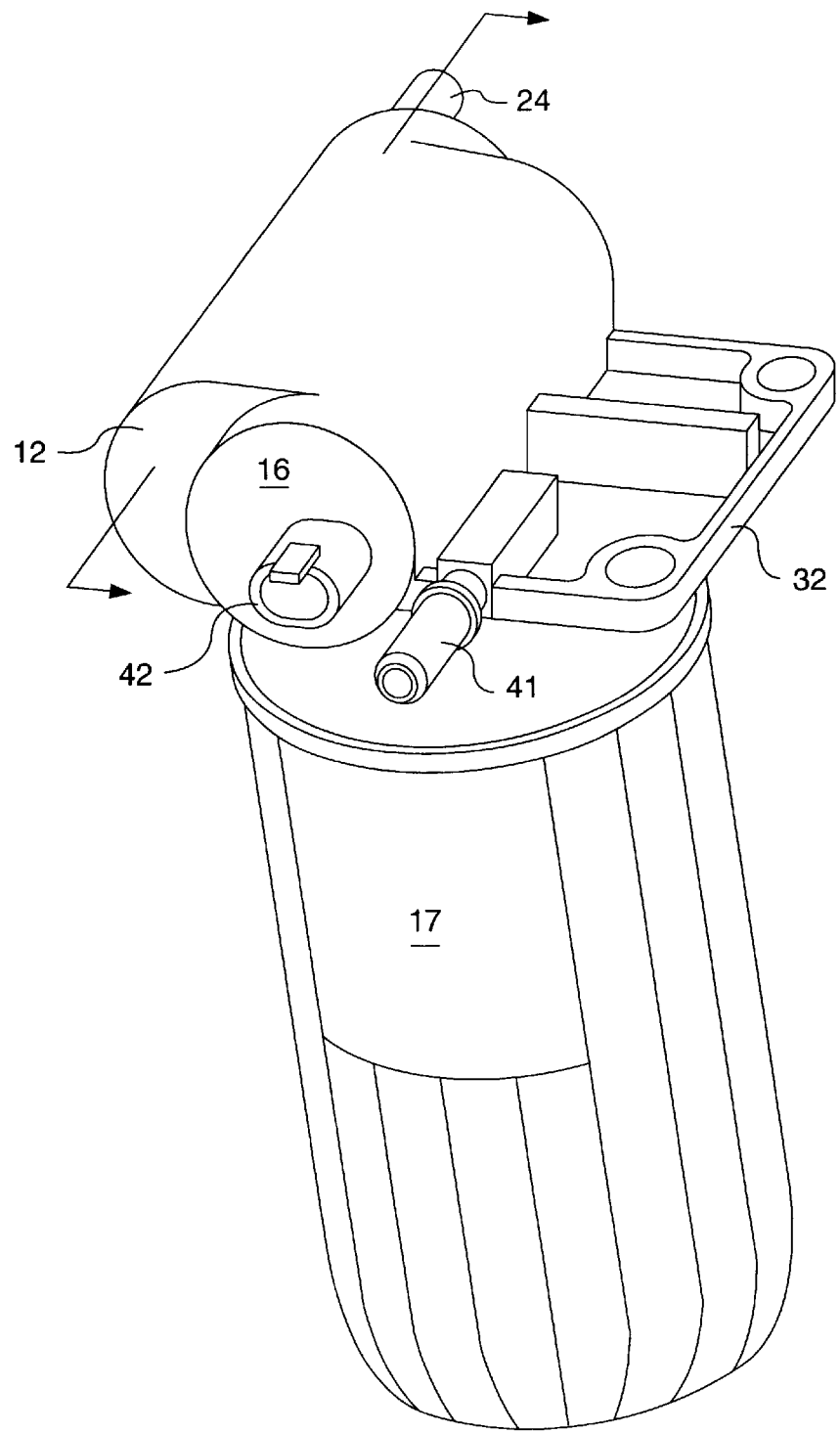
FIG. 2 is an isometric view of a combined fuel circulation pump, filter and conditioning module according to the present invention.
Figure 3:
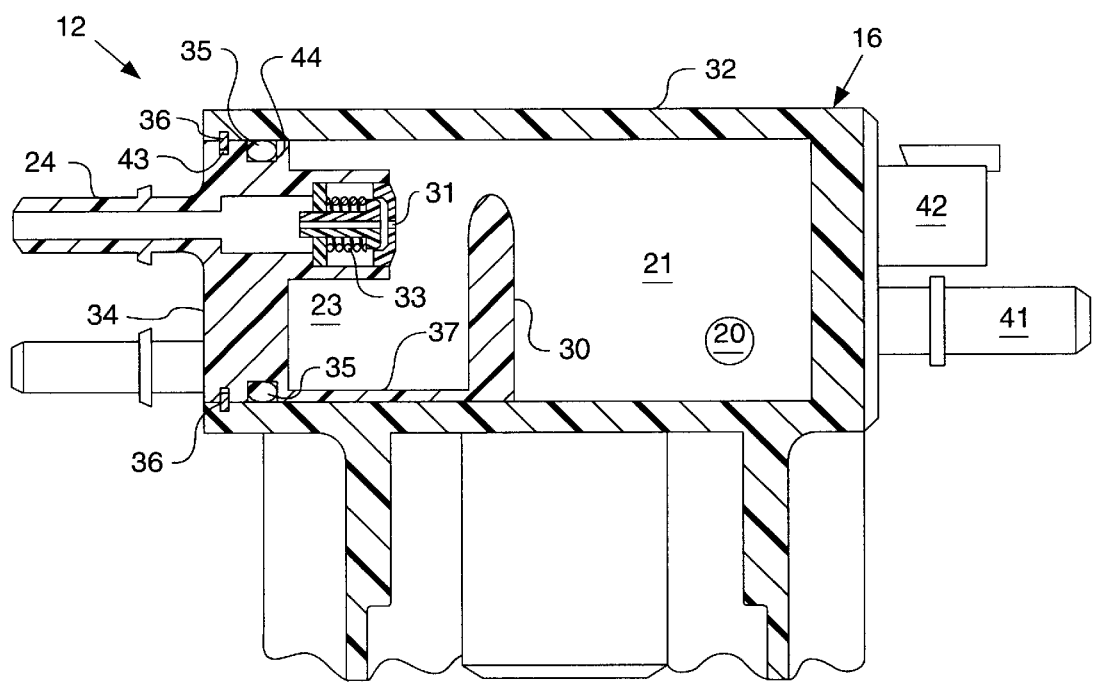
FIG. 3 is a sectioned side view of the fuel conditioning module of FIG. 1.

Referring in addition to FIGS. 2 and 3, fuel leaving outlet 40 from fuel tank 13 enters common housing 32 at a housing inlet 41. At this point, the fuel travels through an internal passageway through fuel filter 17, which is preferably designed to remove any precipitates and other solids from fuel flowing in fuel circulation plumbing 11, and to separate any water from the fuel. The trapped water may be drained from the fuel circulation plumbing via a drain valve 39 located at the bottom of common housing 32. After being filtered, the fuel is drawn into electric fuel transfer pump 16 and then passed to fuel conditioning module 12. Electric fuel transfer pump preferably operates at a constant flow rate via a continuous electrical supply that is provided via electrical connector 42. The relatively fixed flow rate of transfer pump 16 is preferably sized to meet the maximum demands of fuel injectors 15 even when a substantial portion of the fuel is recirculated via vent line 25. After passing from transfer pump 16, the fuel and any air mixed with the same, is passed to fuel conditioning module 12 where the fuel air mixture is divided between two separate passages. The fuel conditioning module 12 operates to concentrate the bulk of the air into a bypass vent passage 24 that is returned to tank 13 via vent line 25. The remaining portion of the fuel that contains relatively low concentrations of air, is passed to high pressure fuel injection pump 14 at a relatively steady pressure via outlet passage 22.

Figure 4:
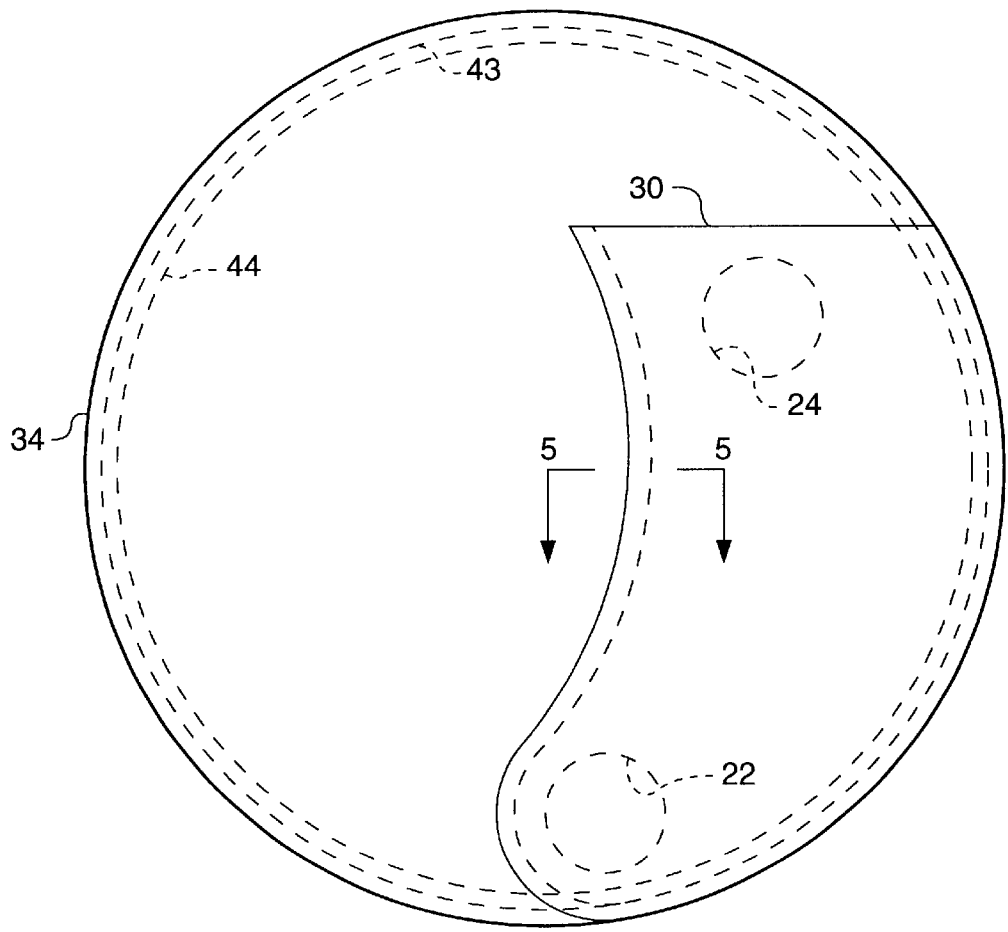
FIG. 4 is an end view of the end cap/baffle portion of the fuel conditioning module.
Figure 5:
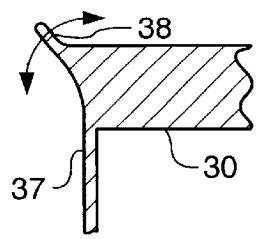
FIG. 5 is a partial sectioned view of the baffle portion of the end cap of FIG. 4.

Referring now to FIGS. 3–5, fuel conditioning module 12 occupies a portion of common housing 32, and includes an inlet cavity 21 separated from an outlet cavity 23 by a baffle 30. Preferably, when in operation in fuel system 10, the common housing 32 has an orientation as shown in FIG. 3 such that inlet passage 20 and outlet passage 22 open to their respective inlet cavities 21 and outlet 23 at locations elevationally below the top of baffle 30. Vent passage 24 is preferably located elevationally above outlet passage 22 and positioned adjacent the top of baffle 30. A pressure regulating valve 31 is preferably positioned between vent passage 24 and outlet cavity 23. However, pressure regulating valve 31 could be positioned at any suitable location in vent line 25. Because the fuel transfer pump operates at a relatively constant flow rate, pressure regulating valve 31 is preferably a spring biased check valve that opens when pressure in outlet cavity 23 exceeds a predetermined pressure. For instance, during low fuel demands, such as when the engine is operating at idle, the bulk of the fuel moved by the electric transfer pump pushes open fuel pressure regulating valve 31 to route the excess fuel back to tank via vent passage 24. A bleed orifice 33 can be incorporated into pressure regulation valve 31 as shown, or can be simply a separate passage of a predetermined flow area connecting vent passage 24 to outlet cavity 23. The flow area of the bleed orifice is preferably sized to be as large as possible in order to speed priming without undermining the ability of the fuel conditioning module to meet the maximum demands of fuel injectors 15 via the flow through outlet passage 22.

The positioning, shape and height of baffle 30 influences the effectiveness of fuel conditioning module 12. For instance, the height of the baffle 30 should preferably be such that the flow area over the baffle is substantially larger, maybe on the order of 50% larger, than the combined flow area of bleed orifice 33 and outlet passage 22, and also greater than the flow area of inlet passage 20 in order to avoid creation of a flow restriction to the flow over the baffle. In addition, the positioning of baffle 30 should preferably be such that inlet cavity 21 is sufficiently large that fuel speed slows when entering inlet cavity 21 before flowing over baffle 30. As the fuel and air mixture flows over baffle 30, the air tends to rise toward the higher areas via a buoyancy effect in order to be captured in bleed orifice 33 and routed back to tank 13. Because of the difficulty in molding baffle 30 directly into common housing 32, it is preferably attached and molded as a portion of an end cap 34 that includes vent passage 24 and outlet passage 22. The pressure regulation valve 31 is then attached to end cap 34 in a conventional manner. End cap 34 is also molded to include an O-ring groove 44, a snap ring groove 43 and small flexible sealing flanges 38 that partially surround baffle 30. Sealing flanges 38 tend to insure that fuel flows over baffle 30 rather than around it. In addition, the biased direction of sealing flanges 38 insures that pressure in inlet cavity 21 urges sealing flanges 38 into contact with the interior wall of inlet cavity 21 to prevent fuel from flowing around baffle 30. When end cap 34 is mated into the remaining portion of common housing 32, an O-ring 35 is positioned in O-ring groove 44 and serves to prevent leakage of fuel from conditioning module 12 to the outside of housing 32. In addition, a snap ring 36 is positioned in snap ring groove 43 to secure end cap 34 to the remaining portion of housing 32, and preferably render the same irreversibly attached and hence nonserviceable.

INDUSTRIAL APPLICABILITY

The present invention finds potential application in any fuel injection system, such as pump and line systems, where fuel aeration is a potential concern. When in operation, the fuel system 10 illustrated in FIG. 1 insures that air laden fuel is returned to the fuel tank for recirculation rather than being advanced to the high pressure fuel pump 14 for delivery to the fuel injectors 15. Regardless what the engine operating condition is, the electric fuel transfer pump 16 of the present invention preferably supplies a relatively constant flow of fuel that is sufficiently high to meet the maximum demands of fuel injectors 15 while also providing an adequate flow volume to divert air and some fuel back to tank 13. In particular, transfer pump 16 draws fuel from outlet 40 of fuel tank 13 along upstream supply passage 18a to inlet 41. Upon entering common housing 32, the fuel travels through internal passages through fuel filter 17 and then through fuel transfer pump into fuel conditioning module 12. The fuel arrives at inlet cavity 21 via an inlet passage 20 and then flows over baffle 30 into outlet cavity 23. Because the flow pattern developed by baffle 30 and due to the buoyancy forces produced by gravity, the air laden fuel is directed into bleed hole 33 for recirculation back to fuel tank 13 via vent passage 24 and vent line 25. The portion of the fuel with little or no air is directed into the lower outlet passage 22 and directed to high pressure fuel pump 14. When fuel demand is low, such as at low speed and low conditions, the excess fuel produced by electric transfer pump 16 causes a pressure rise in outlet cavity 23 that pushes pressure regulating valve 31 to an open position to simply route the excess fuel back to tank.

It should be understood that the above description is intended for illustrative purposes only, and is not intended to limit the scope of the present invention in any way. For instance, the fuel conditioning module of the present invention could be contained in a housing separate from fuel transfer pump 16 and/or fuel filter 17, or incorporated into the fuel circulation plumbing in any suitable manner. In addition, while the invention has been illustrated in the context of a pump and line system, it could find potential application in any type of fuel injection system where fuel aeration is a concern. Thus, those skilled in the art will appreciate that other aspects, objects and advantages of this invention can be obtained from a study of the drawings, the disclosure and the following claims.

What is claimed is:

1. A fuel system for an engine, comprising:

fuel circulation plumbing that includes a fuel conditioning module, and said module including an inlet passage, an inlet cavity, an outlet passage, a vent passage and an outlet cavity, and said inlet cavity being separated from said outlet cavity by a baffle;

said inlet passage opening to said inlet cavity, and said outlet passage opening to said outlet cavity at locations elevationally below a top of said baffle, and said vent passage opening to said outlet cavity at a location elevationally above said outlet passage;

said fuel circulation plumbing includes a fuel tank;

a high pressure fuel injection pump fluidly connected to said fuel circulation plumbing;

at least one fuel injector fluidly connected to said fuel circulation plumbing downstream from said fuel injection pump and upstream from said fuel tank;

a vent line fluidly connecting said vent passage to said fuel circulation plumbing downstream from said at least one fuel injector; and said fuel conditioning module being fluidly positioned upstream from said fuel injection pump and downstream from said fuel tank.

2. The fuel system of claim 1 including a fuel filter fluidly connected to said fuel circulation plumbing downstream from said fuel tank and upstream from said fuel conditioning module.

3. The fuel system of claim 2 including an electric fuel transfer pump fluidly connected to said fuel circulation plumbing between said fuel filter and said fuel conditioning module.

4. The fuel system of claim 3 including a pressure regulating valve positioned at least partially in at least one of said vent passage and said vent line.

5. The fuel system of claim 4 wherein said fuel filter, said electric fuel transfer pump and said fuel conditioning module share a common housing.

6. A fuel conditioning module comprising:

a housing having disposed therein an inlet passage, an inlet cavity, an outlet passage, an outlet cavity and a vent passage, and said inlet cavity being separated from said outlet cavity by a baffle;

said inlet passage opening to said inlet cavity, and said outlet passage opening to said outlet cavity at locations elevationally below a top of said baffle, and said vent passage opening to said outlet cavity at a location elevationally above said outlet passage; and a fuel filter and an electric fuel transfer pump attached to said housing.

7. The fuel conditioning module of claim 6 wherein said inlet passage has an inlet flow area;

a flow area over said baffle between said inlet cavity and said outlet cavity being substantially greater than said inlet flow area.

8. The fuel conditioning module of claim 6 including a pressure regulating valve at least partially positioned in said vent passage.

9. The fuel conditioning module of claim 7 including a pressure regulating valve at least partially positioned in said vent passage.

10. A method of conditioning fuel, comprising the steps of:

dividing a mixture of fuel and air into a first portion having relatively large amounts of air and a second portion having relatively low amounts of air at least in part by separating an inlet cavity from an outlet cavity by a baffle;

routing the first portion a vent passage that opens to the outlet cavity;

routing the second portion an outlet passage that opens to the outlet cavity;

wherein said dividing step and said routing steps being performed in a housing;

attaching an electric fuel pump to said housing; and attaching a fuel filter to said housing.

11. The method of claim 10 wherein said dividing step includes a step of locating an inlet passage into the inlet cavity at a location elevationally below the top of said baffle.

12. The method of claim 11 wherein said step of routing the second portion includes a step of locating the outlet passage at a location elevationally below the top of said baffle.

13. The method of claim 12 wherein said step of routing the first portion includes a step of locating the vent passage at a location elevationally above the top of said outlet passage.

* * * * *